United States Patent
Yang

(10) Patent No.: US 8,289,843 B2
(45) Date of Patent: Oct. 16, 2012

(54) SERVICE FAILURE RECOVERY METHOD AND SYSTEM

(75) Inventor: Yu Yang, Shenzhen (CN)

(73) Assignee: Huawai Technologies Co., Ltd., Shenzhen (CN)

( * ) Notice: Subject to any disclaimer, the term of this patent is extended or adjusted under 35 U.S.C. 154(b) by 27 days.

(21) Appl. No.: 12/102,421

(22) Filed: Apr. 14, 2008

(65) Prior Publication Data

US 2008/0192626 A1     Aug. 14, 2008

Related U.S. Application Data

(63) Continuation of application No. PCT/CN2006/003722, filed on Dec. 30, 2006.

(30) Foreign Application Priority Data

Jan. 10, 2006    (CN) .......................... 2006 1 0032780

(51) Int. Cl.
    *G06F 11/00*    (2006.01)
(52) U.S. Cl. ...................................................... 370/225
(58) Field of Classification Search ................. 370/219, 370/223, 216, 225; 714/4
    See application file for complete search history.

(56) References Cited

U.S. PATENT DOCUMENTS

| | | | |
|---|---|---|---|
| 6,111,881 A | | 8/2000 | Soncodi |
| 6,292,463 B1 * | | 9/2001 | Burns et al. ................... 370/216 |
| 7,426,179 B1 * | | 9/2008 | Harshavardhana et al. .. 370/219 |
| 7,471,625 B2 * | | 12/2008 | Suemura ........................ 370/223 |
| 2003/0145246 A1 | | 7/2003 | Suemura |
| 2004/0107382 A1 * | | 6/2004 | Doverspike et al. ............. 714/4 |

FOREIGN PATENT DOCUMENTS

| | | |
|---|---|---|
| CN | 1674527 A | 9/2005 |
| CN | 1710868 A | 12/2005 |
| CN | 1710869 A | 12/2005 |
| CN | 1798051 A | 7/2006 |
| EP | 1134922 A2 | 9/2001 |
| JP | 2001-036587 A | 2/2001 |
| JP | 2001036587 A | 2/2001 |
| WO | WO 2007/079659 A1 | 7/2007 |

OTHER PUBLICATIONS

Zhiqiang et al., "Application of RSVP-TE in the ASON," *Selection of Thesis Papers*, 3: 45-50 (2005).

(Continued)

*Primary Examiner* — Anh-Vu Ly
*Assistant Examiner* — Gbemileke Onamuti
(74) *Attorney, Agent, or Firm* — Leydig, Voit & Mayer, Ltd.

(57) ABSTRACT

A method and system for recovering from service failure, and the method includes: sending, by a failure detecting node of a cross-domain connection service, a CALL_ID (Call Identifier) that identifies the cross-domain connection service and information on a disabled link in the cross-domain connection service to a first node of the cross-domain connection service, and performing, by the first node of the cross-domain connection service, an end-to-end connection recovery on a corresponding cross-domain connection service according to the CALL_ID and the information on the disabled link. According to the invention the end-to-end connection recovery of the cross-domain connection service can be implemented and the viability of the cross-domain connection service can be improved.

10 Claims, 2 Drawing Sheets

OTHER PUBLICATIONS

English Translation of Written Opinion from International Patent Application No. PCT/CN2006/003722.

Lang et al., "RSVP-TE Extensions in Support of End-to-End Generalized Multi-Protocol Label Switching (GMPLS)-based Recovery," *IETF Internet Draft*, 1-39 (Apr. 2005) http://tools.ietf.org/html/draft-ietf-ccamp-gmpls-recovery-e2e-sig naling-03 [retrieved on Sep. 18, 2008].

ZTE Corporation, "Adding Local Restoration Scenarios into G.8080 Appendix," *International Telecommunication Union—Telecommunication Standardization Sector Study Period 2005-2008*, Study Group 15—Delayed Contribution 336:1-6 (May 2005).

1st Office Action in corresponding European Application No. 06840752.7 (Aug. 7, 2009).

2nd Office Action in corresponding European Application No. 06840752.7 (Dec. 7, 2009).

Notice of Opposition in corresponding European Application No. 06840752.7 (May 25, 2011).

Opposition Search Report against corresponding European Patent 1 973 267 B1 (May 18, 2011).

"COM15-D334-E—A proposal for introducing the concept of virtual connection and relative requirements into G.8080," Study Group 15—Delayed Contribution 334, ZTE Corporation, May 16-27, 2005, International Telecommunications Union, Geneva, Switzerland.

* cited by examiner

SERVICE FAILURE RECOVERY METHOD AND SYSTEM

CROSS-REFERENCE TO RELATED APPLICATIONS

The present application is a continuation of International Patent Application No. PCT/CN2006/003722, filed on Dec. 30, 2006, which claims priority to Chinese Patent Application No. 200610032780.3 filed on Jan. 10, 2006, entitled "METHOD FOR RECOVERING FROM SERVICE FAILURE". Both of these applications are hereby incorporated by reference in their entirety.

FIELD OF THE INVENTION

The present invention relates to the technical field of network and communications, in particular, to a method and system for recovering from cross-domain service failure.

BACKGROUND OF THE INVENTION

The service of a traditional optical network is scheduled in a static configuration mode through network management, and a dynamic activation mode is not supported. At the same time, most of the traditional optical networks employ linear and ring networking technologies, and use multiplex section protection and sub-network connection protection in protective recovery, which is basically a static recovery method. However, with the rapid development of data service and private line service, demand for network bandwidth is becoming stronger, and requirements on the dynamic allocation of network bandwidth is also becoming more urgent. The network is required to have dynamic activation capacity and to support the structure of mesh networks, and also have flexible extension capacity and a function of rapid protective recovery. Automatic Switch Optical Network (ASON) resolves the above problem. ASON uses GMPLS (Generalized Multiprotocol Label Switching) Protocol on the control plane, which has become a critical technology in the development of the optical network. In ASON, two new connection types are provided: one is a soft permanent connection mode and the other is a switched connection mode. At present, the ITU-T (International Telecommunication Union Telecommunication Standardization Sector) has basically completed the architecture and definitions of various requirements of ASON, and the IETF (Internet Engineering Task Force) has completed protocol extension and definitions of intra-single domain signaling, automatic discovery and routing.

With the development of the ASON network, the problem of managing of large-scale network needs to be solved in the control plane. At present, both the ITU-T and the OIF (Optical Internet Forum) use a hierarchical network model in which a control domain of the lower layer is represented by a proxy node in the upper layer, and the proxy node may issue the abstract topology, inter-domain link, accessible address and thereby represent the domain. Therefore, a hierarchical network may be formed upwardly layer by layer. For example, in FIG. 1, Layer 0 is an actual network which is divided into a plurality of control domains, such as CD1, CD2, CD3 and CD4, and on Layer 1, each domain is abstracted as a node, i.e. RC11, RC12, RC13 and RC14 and so on in the figure. The whole network has a network topology of three layers.

In a multi-domain network, the speed of connection recovery becomes an important bottleneck, because in the case of the multi-domain network, the connection passes through a plurality of domains and the number of nodes that are passed is much greater than that in the case of a single domain network. This has become an urgent problem that needs to be solved after completion of network extension. Usually, for cross-domain connection service, when an intra-domain failure occurs, an intra-domain tunnel is employed to implement local recovery. When a failure occurs on an inter-domain link, an inter-domain protection or rapid recovery mechanism is usually employed to recover from the failure. However, an end-to-end connection recovery needs to be performed when the intra-domain cannot be recovered from a failure due to insufficient intra-domain bandwidth resources, or when the inter-domain rapid recovery mechanism is disabled or there is no related inter-domain rapid recovery method if an inter-domain failure occurs. However, a cross-domain connection is required to signal via External Node-Node Interface (ENNI), and session process needs to be established in segments during establishment of the connection. Because the whole end-to-end cross-domain connection service of the cross-domain connection service cannot be specifically determined, the failure detecting node cannot report, to the first node of the service, information concerning the cross-domain connection service in which the failure occurs. Therefore, the end-to-end connection recovery of the cross-domain connection service is hard to perform, and the viability of the cross-domain connection service is lowered.

SUMMARY OF THE INVENTION

The embodiments of the present invention provide a method and system for recovering from a service failure, by which an end-to-end connection recovery of a cross-domain connection service may be implemented, and the viability of the cross-domain connection service may be improved.

A method for recovering from a service failure, which is used for implementing end-to-end connection recovery of cross-domain connection service, includes: sending, by a failure detecting node of the cross-domain connection service, a CALL_ID (Call Identifier) that identifies the cross-domain connection service and information on a disabled link in the cross-domain connection service to a first node of the cross-domain connection service; determining, by the first node of the cross-domain connection service, the failed cross-domain connection service according to the CALL_ID; and performing the end-to-end connection recovery on the determined failed cross-domain connection service according to the information on the disabled link in the cross-domain connection service.

A system for recovering from a service failure, which is used for implementing end-to-end connection recovery of cross-domain connection service, includes: a failure detecting unit, configured to detect a service failure and sending a CALL_ID that identifies the failed cross-domain connection service and information on a disabled link in the cross-domain connection service to a first node of the cross-domain connection service, in which the first node of the cross-domain connection service is configured to recalculate a route according to the information on the disabled link and obtain a recovery connection path of a destination node of the cross-domain connection service; and a failure recovery unit, configured to perform an end-to-end connection recovery on a failed cross-domain connection service according to the information on the disabled link in the cross-domain connection service and the recovery connection path.

It can be seen from the above technical solutions of the embodiments of the present invention that, in the embodiments of the invention, a cross-domain connection service is identified uniquely by employing an object CALL_ID defined in the standard. After a service failure has been detected, a failure detecting node of the cross-domain connection service sends a CALL_ID that identifies the cross-domain connection service and the information on the disabled link in the cross-domain connection service to the first node of the cross-domain connection service. The first node of the cross-domain connection service performs the end-to-end connection recovery on corresponding cross-domain connection service according to the CALL_ID and the information on the disabled link in the cross-domain connection service, thereby implementing the end-to-end connection recovery of the cross-domain connection service, and improving the viability of the cross-domain connection service.

DETAILED DESCRIPTION OF THE EMBODIMENTS

The present invention is described in detail in conjunction with embodiments as follows, so as to make the principles, characteristics and advantages of the present invention more apparent.

Figure 1:
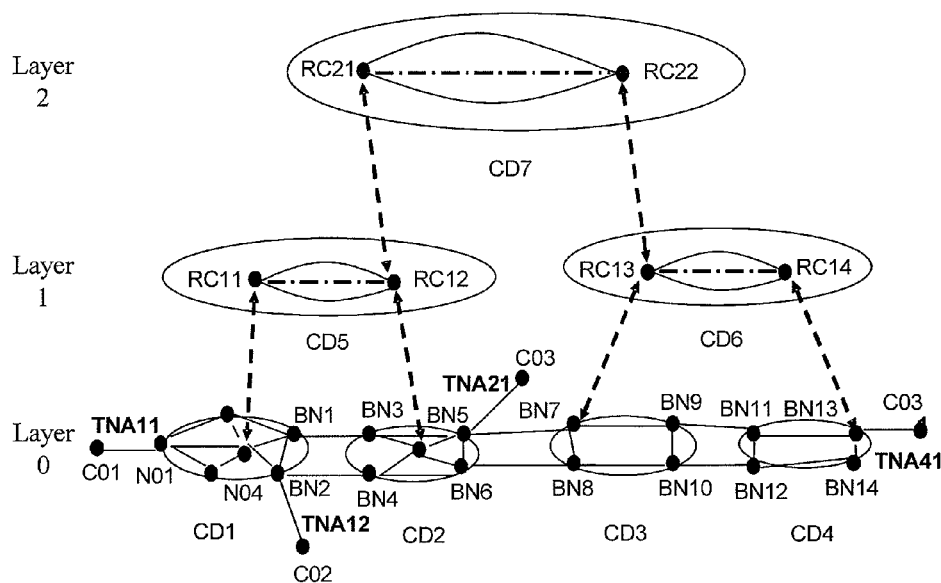
FIG. 1 is a schematic diagram showing a hierarchical network model.
Figure 2:
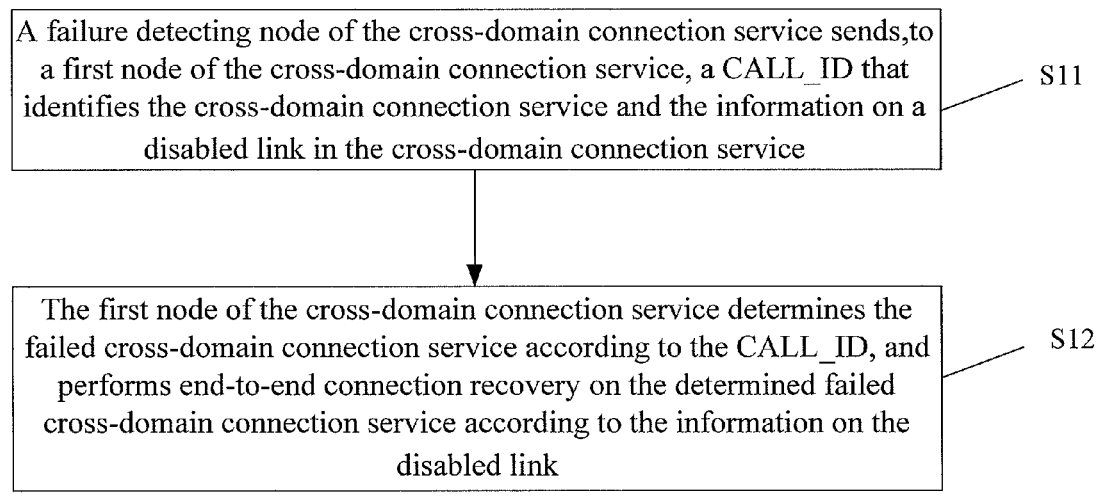
FIG. 2 is a flow chart showing a method for recovering from a service failure according to an embodiment of the invention.

As shown in FIG. 2, the main procedure of the method for recovering from a service failure according to an embodiment of the present invention is as follows:

In S11, a cross-domain connection service is identified uniquely by employing an object CALL_ID (call identifier) defined in the standard, and after a service failure has been detected, a failure detecting node of the cross-domain connection service sends a CALL_ID that identifies the cross-domain connection service and information on a disabled link in the cross-domain connection service to a first node of the cross-domain connection service.

In S12, the first node of the cross-domain connection service determines the failed cross-domain connection service according to the CALL_ID, and performs end-to-end connection recovery on the failed cross-domain connection service that is determined according to the information on the disabled link in the cross-domain connection service.

Because the end-to-end connection service of the cross-domain connection service is implemented, the viability of the cross-domain connection service may be improved greatly, as illustrated in detail below.

Figure 3:
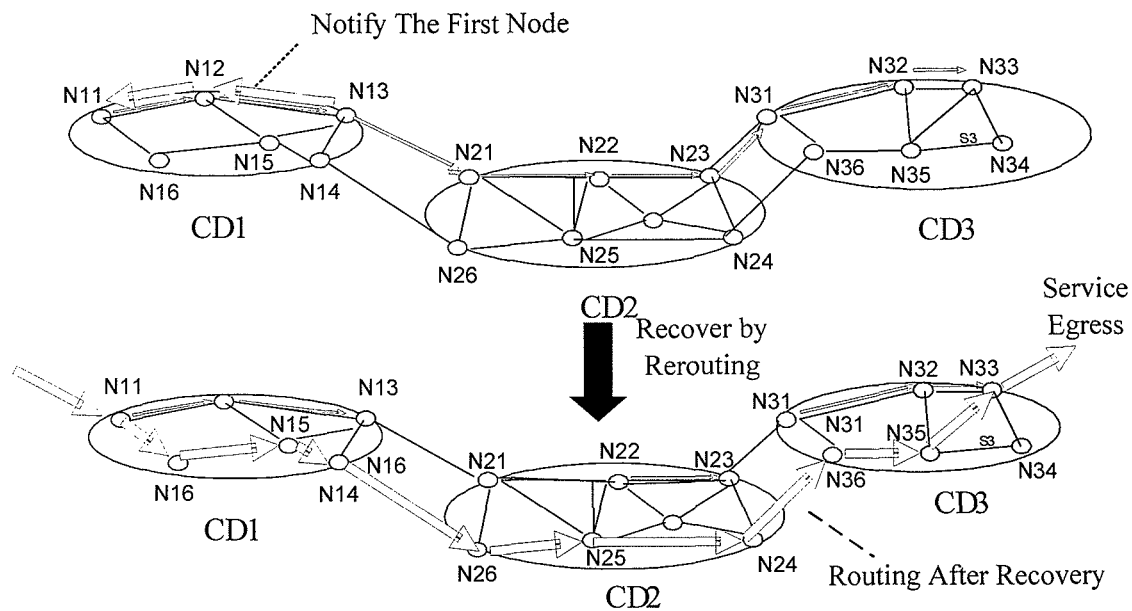
FIG. 3 is a schematic diagram showing an end-to-end failure recovery according to an embodiment of the invention.

FIG. 3 is schematic diagram showing an end-to-end failure recovery according to an embodiment of the present invention. Referring to FIG. 3, when a failure occurs on an inter-domain link N13-N21, the first node N11 of the Label Switched Path (LSP) of the cross-domain connection service may be notified of the failure via Resource Reservation Protocol-Traffic Engineering (RSVP-TE) signaling, and the end-to-end connection recovery is performed. Therefore, in the present invention, a cross-domain end-to-end service is identified uniquely by employing the object CALL_ID defined in the standard. In the case where a plurality of connections exists in a service, such as 1+1 service or concatenation service, the CALL_ID of each connection is identical, and then in the present invention, an active/standby ID field in a RSVP message is extended to carry an index number so as to distinguish respective connections in the service. Specifically, in the method for extending the index number field in the RSVP message, the field Secondary in the object RSVP_PROTECTION can be extended, and the respective different connections in the cross-domain connection service can be distinguished by extending the value of the field. As for the respective different connections in the 1+1 service or concatenation service, because the respective connections have been distinguished by employing the CALL_ID and the index number, each connection may be recovered independently when a failure occurs therein.

The node ID of the first node can be carried straight to each domain in the object Notify Request in the RSVP, or it can be obtained by converting the Transmit Network Address (TNA). When the end-to-end connection recovery needs to be performed due to a failure, the failure detecting point is required to send a message to the first node of the end-to-end connection for performing the recovery.

In the present invention, after the first node ID of the end-to-end connection has been obtained, the unique ID of the failed cross-domain connection service, i.e. the CALL_ID, the field information of the index number and the information on the disabled link are sent via a RSVP message to the first node of the cross-domain connection service for performing recovery. In practical implementation, a connection controller on the first node of the cross-domain connection service obviates the failed link and re-calculates a route according to the information on the disabled link, and inquiries about a recovery connection path to the destination node of the cross-domain service. After the connection controller has obtained the recovery connection path, a protocol controller in the connection controller starts to establish the recovery connection path from the first node to the destination node. After the recovery connection path has been established, the failed service on the disabled link is bridged to the recovery connection path.

It should be noted that in the embodiments of the present invention, after the end-to-end connection recovery of the cross-domain connection service has been completed, both the CALL_ID and the index number of the cross-domain connection service remain unchanged. To distinguish the cross-domain connection service before the recovery from the cross-domain connection service after the recovery at the first node, an instance value field can be extended in the object of the RSVP message for distinguishing. For example, a field in the object RSVP_PROTECTION can be extended and carried straight to respective domains downstream.

The method for recovering from a service failure according to the present invention may be applied in the end-to-end connection in such cases when an intra-domain downstream failure occurs and a recovery has failed, or when an intra-domain failure recovery is disabled, or when failure occurs on an inter-domain link while no inter-domain rapid recovery method is employed or the inter-domain rapid recovery cannot be accomplished. By employing the end-to-end connection recovery of the cross-domain connection service, the viability of the cross-domain connection service can be guaranteed to the maximum extent, as illustrated by a specific embodiment below.

Figure 4:
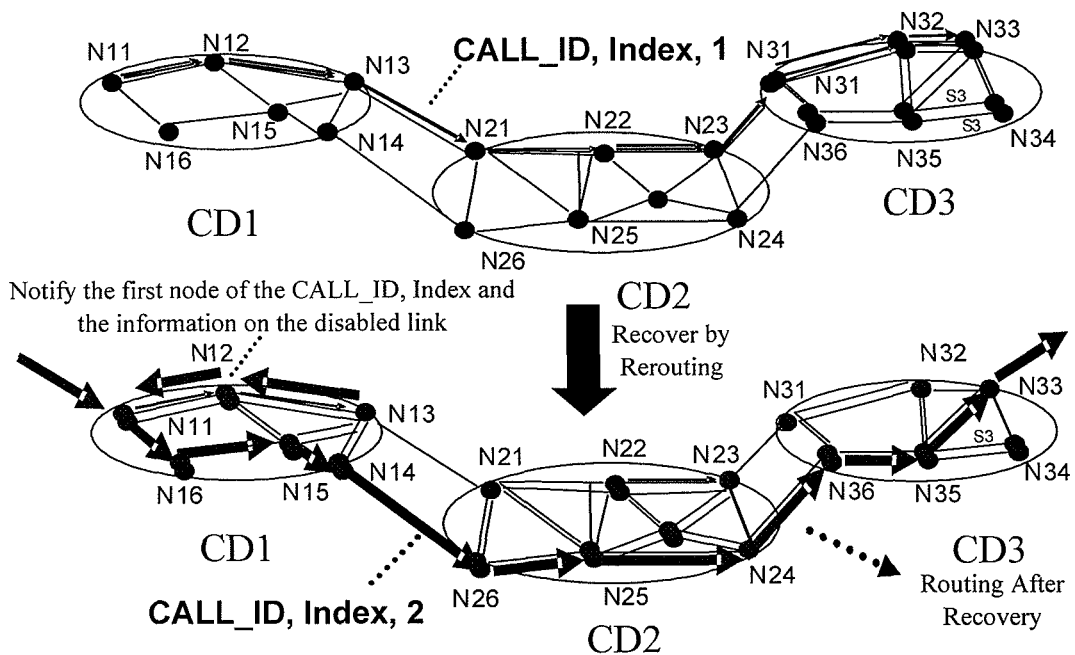
FIG. 4 is a schematic diagram showing a failure recovery in the method for recovering from a service failure according to an embodiment of the invention.

In the network shown in FIG. 4, there exists a cross-domain connection service. Because it is not the 1+1 service and the concatenation service, the cross-domain connection service has only one connection. The routing of the connection is as follows:

N11->N12->N13->N21->N22->N23->N31->N32->N33.

In this connection, sessions are established, respectively, in the following five segments: Session N11 to N13, Session N13 to N21 across an ENNI interface, Session N21 to N23, and Session N23 to N31 across an ENNI interface and the final Session N31 to N33. The whole end-to-end connection is established by the above five segments of sessions. In this embodiment, the connection of this service is distinguished from that of other services by the CALL_ID. Because the service is not the 1+1 service and the concatenation service, the index number of the connection may be set as 1, and the instance value field before recovery may be set as 1.

As shown in FIG. 4, when a failure occurs in the inter-domain link N13-N21, the CALL_ID of the connection service and the index number field and the information on the disabled link N13-N21 are found out on N13, and N13 notifies the above found contents to the first node N11 of the end-to-end connection of the cross-domain connection service by sending an RSVP message, and then a new connection, which has the same CALL_ID and index number field as that of the original cross-domain connection service but has a different instance value, is initiated to be established on N11. Specifically, the new connection may be the connection N11->N16->N15->N14->N26->N25->N24->N35->N33, as shown in FIG. 4.

It should be noted that in the embodiments of the invention, if an intra-domain link shown in FIG. 4 becomes disabled, for example, a failure occurs on the link between N21 and N22, the intra-domain recovery can be first performed at N21. When the recovery fails because there are no resources in the intra-domain, N21 may find out the CALL_ID of the end-to-end cross-domain connection service and the information on the index number and send the found contents to the first node of the cross-domain connection service, and the first node of the cross-domain connection service initiates the end-to-end connection recovery.

An embodiment of the present invention also provides a system for recovering from a service failure, which is used for implementing the end-to-end connection recovery of the cross-domain connection service. The system includes the following: (1) a failure detection unit, configured to detect a service failure and sending a CALL_ID that identifies the failed cross-domain connection service and the information on a disabled link in the cross-domain connection service to a first node of the cross-domain connection service, in which the first node of the cross-domain connection service is configured to re-calculate a route according to the information on the disabled link, and obtain a recovery connection path of a destination node of the cross-domain connection service; and (2) a failure recovery unit, configured to perform the end-to-end connection recovery on the failed cross-domain connection service according to the information on the disabled link in the cross-domain connection service and the recovery connection path.

Additional advantages and modifications will readily occur to those skilled in the art. Therefore, the present invention is not limited to the specific details and representative embodiments shown and described herein. Accordingly, various modifications and variations may be made without departing from the scope of the present invention as defined by the appended claims and their equivalents.

The invention claimed is:

1. A method for recovering from an end-to-end connection failure, the method comprises:
   receiving, by a first node of a cross-domain connection service, a CALL_ID that uniquely identifies the cross-domain connection service, an index number that identifies a failed end-to-end connection in the cross-domain connection service, and information on a disabled link in the cross-domain connection service from a failure detecting node of the cross-domain connection service; wherein the cross-domain connection service passes through a plurality of domains, the cross-domain connection service occupies a plurality of end-to-end connections, the same CALL_ID is employed for the end-to-end connections in the same service, a plurality of different index numbers are employed for identifying different end-to-end connections in the cross-domain connection service; wherein each of the plurality of end-to-end connections is uniquely identifiable by the CALL_ID and one of the plurality of index numbers, each of the plurality of end-to-end connections passes through different path, the paths that the plurality of end-to-end connections pass have the same end nodes and different intermediate nodes, wherein the end nodes are the first node and the last node of the cross-domain connection service, the intermediate nodes are the nodes within the plurality of domains through which the cross-domain connection service passes;
   determining, by the first node of the cross-domain connection service, the failed end-to-end connection in the cross-domain connection service according to the received CALL_ID and the received index number; and
   performing, by the first node of the cross-domain connection service, an end-to-end connection recovery on the determined failed end-to-end connection according to the information on the disabled link in the cross-domain connection service;
   the process for performing the end-to-end connection recovery on the determined failed end-to-end connection comprises:
   recalculating a recovery end-to-end connection according to the information on the disabled link, the recovery end-to-end connection passes through the first node of the cross-domain connection service, the last node of the cross-domain connection service, and a plurality of intermediate nodes that are different from the intermediate nodes of the other end-to-end connections that are occupied by the cross-domain connection service; wherein the recovery end-to-end connection is assigned the same CALL_ID and the same index number as the failed connection;
   starting to establish the recovery end-to-end connection after obtaining the recovery end-to-end connection path; and
   bridging the failed end-to-end connection on the disabled link to the recovery end-to-end connection after the recovery end-to-end connection has been established.

2. The method for recovering from an end-to-end connection failure according to claim 1, wherein the CALL_ID and the index number are received through a Resource Reservation Protocol message.

3. The method for recovering from an end-to-end connection failure according to claim 2, wherein the Resource Reservation Protocol message is a notification message, and an object therein carries the index number that identifies the failed end-to-end connection in the cross-domain connection service.

4. The method for recovering from an end-to-end connection failure according to claim 1, wherein:
   an ID of the first node is carried to respective domains via an object of Resource Reservation Protocol (RSVP), or the ID of the first node is obtained by converting Transmit Network Address (TNA); and
   sending, according to the ID of the first node, a message to the first node of the end-to-end connection for performing the recovery when the end-to-end connection recovery needs to be performed due to a failure.

5. The method for recovering from an end-to-end connection failure according to claim 1, wherein:
   a field is extended in the object of the RSVP message to carry the CALL_ID and the index number to respective domains downstream, thereby distinguishing the cross-domain connection service before the recovery from the cross-domain connection service after the recovery.

6. The method for recovering from an end-to-end connection failure according to claim 1, wherein the service is a 1+1 service or concatenation service.

7. The method for recovering from an end-to-end connection failure according to claim 1 further comprising:
   performing intra-domain recovery on corresponding node if a failure occurs on an intra-domain link; and
   receiving information on the CALL_ID of the end-to-end cross-domain connection service and the index number when the intra-domain recovery fails, thereby initiating the end-to-end connection recovery.

8. A device used in recovery from an end-to-end connection failure, the device comprises:
   a first unit configured to receive a CALL_ID that uniquely identifies a cross-domain connection service, a index number that identifies a failed end-to-end connection in the cross-domain connection service, and information on a disabled link in the cross-domain connection service from a failure detecting node of the cross-domain connection service; wherein the cross-domain connection service passes through a plurality of domains, the cross-domain connection service occupies a plurality of end-to-end connections, the same CALL_ID is employed for the end-to-end connections in the same service, a plurality of different index numbers are employed for identifying different end-to-end connections in the cross-domain connection service; wherein each of the plurality of end-to-end connections is uniquely identifiable by the CALL_ID and one of the plurality of index numbers, each of the plurality of end-to-end connections passes through different path, the paths that the plurality of end-to-end connections pass have the same end nodes and different intermediate nodes, wherein the end nodes are the first node and the last node of the cross-domain connection service, the intermediate nodes are the nodes within the plurality of domains through which the cross-domain connection service passes;
   a second unit configured to determine the failed end-to-end connection in the cross-domain connection service according to the received CALL_ID and the received index number;
   and
   a third unit configured to recalculate a recovery end-to-end connection according to the information on the disabled link, the recovery end-to-end connection passes through the first node of the cross-domain connection service, the last node of the cross-domain connection service, and a plurality of intermediate nodes that are different from the intermediate nodes of the other end-to-end connections the cross-domain connection service occupies; wherein the recovery end-to-end connection is assigned the same CALL_ID and the same index number as the failed connection;
   to start to establish the recovery end-to-end connection after obtaining the recovery end-to-end connection path; and
   to bridge the failed end-to-end connection on the disabled link to the recovery end-to-end connection after the recovery end-to-end connection has been established.

9. The device according to claim 8, further comprises:
   the third unit, configured to perform intra-domain recovery on corresponding node if a failure occurs on an intra-domain link; and
   the first unit, configured to receive information on the CALL_ID of the end-to-end cross-domain connection service and the index number when the intra-domain recovery fails, thereby initiating the end-to-end connection recovery.

10. A method for recovering from an end-to-end connection failure, the method comprises:
   receiving, by a first node of a cross-domain connection service, a CALL_ID that uniquely identifies a cross-domain connection service, a index number that identifies a failed end-to-end connection in the cross-domain connection service, and information on a disabled link in the cross-domain connection service from a failure detecting node of the cross-domain connection service; wherein the cross-domain connection service passes through a plurality of domains, the cross-domain connection service occupies a plurality of end-to-end connections, the same CALL_ID is employed for the end-to-end connections in the same cross-domain connection service, a plurality of different index numbers are employed for identifying different end-to-end connections in the cross-domain connection service; wherein each of the plurality of end-to-end connections is uniquely identifiable by the CALL_ID and one of the plurality of index numbers;
   determining, by the first node of the cross-domain connection service, the failed end-to-end connection in the cross-domain connection service according to the received CALL_ID and the received index number; and
   performing, by the first node of the cross-domain connection service, an end-to-end connection recovery on the determined failed end-to-end connection according to the information on the disabled link in the cross-domain connection service.

* * * * *